US011256810B2

(12) United States Patent
Jaeger et al.

(10) Patent No.: US 11,256,810 B2
(45) Date of Patent: Feb. 22, 2022

(54) SYSTEMS, COMPUTING DEVICES, AND METHODS FOR AUTHENTICATING PRIVILEGED SUBSYSTEM ACCESS BY POLICY AND BY USE OF A SECURITY KEY GENERATED AT BOOT

(71) Applicant: Lenovo Enterprise Solutions (Singapore) Pte. Ltd., New Tech Park (SG)

(72) Inventors: William Jaeger, Research Triangle Park, NC (US); Sumeet Kochar, Research Triangle Park, NC (US); Scott Piper, Research Triangle Park, NC (US); Christopher Wood, Research Triangle Park, NC (US)

(73) Assignee: Lenovo Enterprise Solutions (Singapore) Ptd. Ltd., Singapore (SG)

( * ) Notice: Subject to any disclaimer, the term of this patent is extended or adjusted under 35 U.S.C. 154(b) by 0 days.

(21) Appl. No.: 16/697,074

(22) Filed: Nov. 26, 2019

(65) Prior Publication Data
US 2020/0285750 A1    Sep. 10, 2020

Related U.S. Application Data

(60) Provisional application No. 62/814,017, filed on Mar. 5, 2019.

(51) Int. Cl.
| G06F 9/44 | (2018.01) |
| G06F 21/57 | (2013.01) |
| G06F 21/30 | (2013.01) |
| G06F 9/4401 | (2018.01) |

(52) U.S. Cl.
CPC ............ *G06F 21/575* (2013.01); *G06F 21/30* (2013.01); *G06F 9/4401* (2013.01); *G06F 2221/034* (2013.01)

(58) Field of Classification Search
CPC ...... G06F 21/575; G06F 21/30; G06F 9/4401; G06F 2221/034
See application file for complete search history.

(56) References Cited

U.S. PATENT DOCUMENTS

| 2011/0258410 | A1* | 10/2011 | Lambert | G06F 21/575 |
| | | | | 711/164 |
| 2015/0154028 | A1* | 6/2015 | Chen | G06F 11/0766 |
| | | | | 713/2 |
| 2017/0109531 | A1* | 4/2017 | Wang | H04L 9/3234 |
| 2017/0364684 | A1* | 12/2017 | Lea | G06F 12/1027 |

(Continued)

*Primary Examiner* — Zahid Choudhury
(74) *Attorney, Agent, or Firm* — Olive Law Group, PLLC

(57) ABSTRACT

Systems, computing devices, and methods for authenticating privileged subsystem access by policy and by use of a security key generated at boot are disclosed herein. According to an aspect, a method includes generating a security key upon boot of a host-facing interface for a client. The method also includes communicating the security key to a baseboard management controller. Further, the method includes authenticating, to the host-facing interface commands, based on the security key. The method may also include implementing a policy associated with the security key. Further, in response to determining that a received command is not allowed by policy or the security key is not authenticated, an external server port or debug header may be disabled to prevent execution of the command.

20 Claims, 5 Drawing Sheets

(56) References Cited

U.S. PATENT DOCUMENTS

| | | | |
|---|---|---|---|
| 2018/0157839 A1* | 6/2018 | Pearson | H04L 9/083 |
| 2018/0260568 A1* | 9/2018 | Cisneros | G06F 21/44 |
| 2019/0045358 A1* | 2/2019 | Ahmed | H04W 12/06 |
| 2019/0114432 A1* | 4/2019 | Tang | G06F 21/575 |
| 2019/0114434 A1* | 4/2019 | Gong | G06F 21/602 |

* cited by examiner

SYSTEMS, COMPUTING DEVICES, AND METHODS FOR AUTHENTICATING PRIVILEGED SUBSYSTEM ACCESS BY POLICY AND BY USE OF A SECURITY KEY GENERATED AT BOOT

CROSS REFERENCE TO RELATED APPLICATION

This application claims priority to U.S. Provisional Patent Application No. 62/814,017, filed Mar. 5, 2019, and titled SYSTEMS, COMPUTING DEVICES, AND METHODS FOR AUTHENTICATING PRIVILEGED SUBSYSTEM ACCESS BY POLICY AND BY USE OF A SECURITY KEY GENERATED AT BOOT, the content of which is incorporated herein by reference in its entirety.

TECHNICAL FIELD

The presently disclosed subject matter relates generally to computer security. Particularly, the presently disclosed subject matter relates to systems, computing devices, and methods for authenticating privileged subsystem access by policy and by use of a security key generated at boot.

BACKGROUND

Data centers are used for housing computer systems, such as servers. Servers can sometimes be used for hosting services for users. For example, hosting servers may host web sites, files, images, games, and various other content. Further, hosting servers may be shared among many clients or dedicated to a single client.

A challenge related to servers is balancing security and manageability. In some instances, clients manage their servers using unsecure interfaces for communication to a baseboard management controller (BMC) of the server. Such interfaces can provide an attack surface that may be exploited in a bare-metal, multi-tenant environment. Concern is also growing around intelligent components (e.g., modules with firmware and persistency) in the system, and interfaces to those components may be accessible to tenants as well.

In view of the foregoing, there is a continuing need to improve security of servers and other computing devices.

BRIEF DESCRIPTION OF THE DRAWINGS

Figure 1:
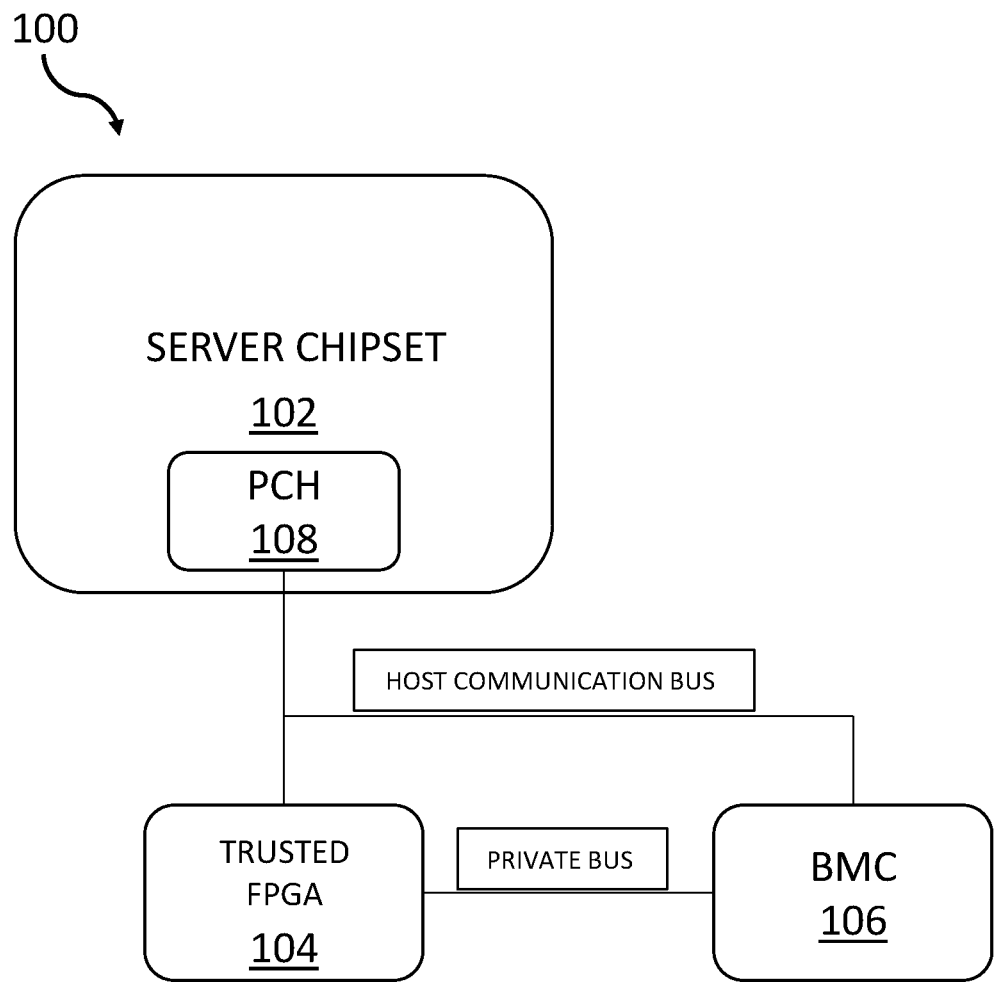
Figure 2:
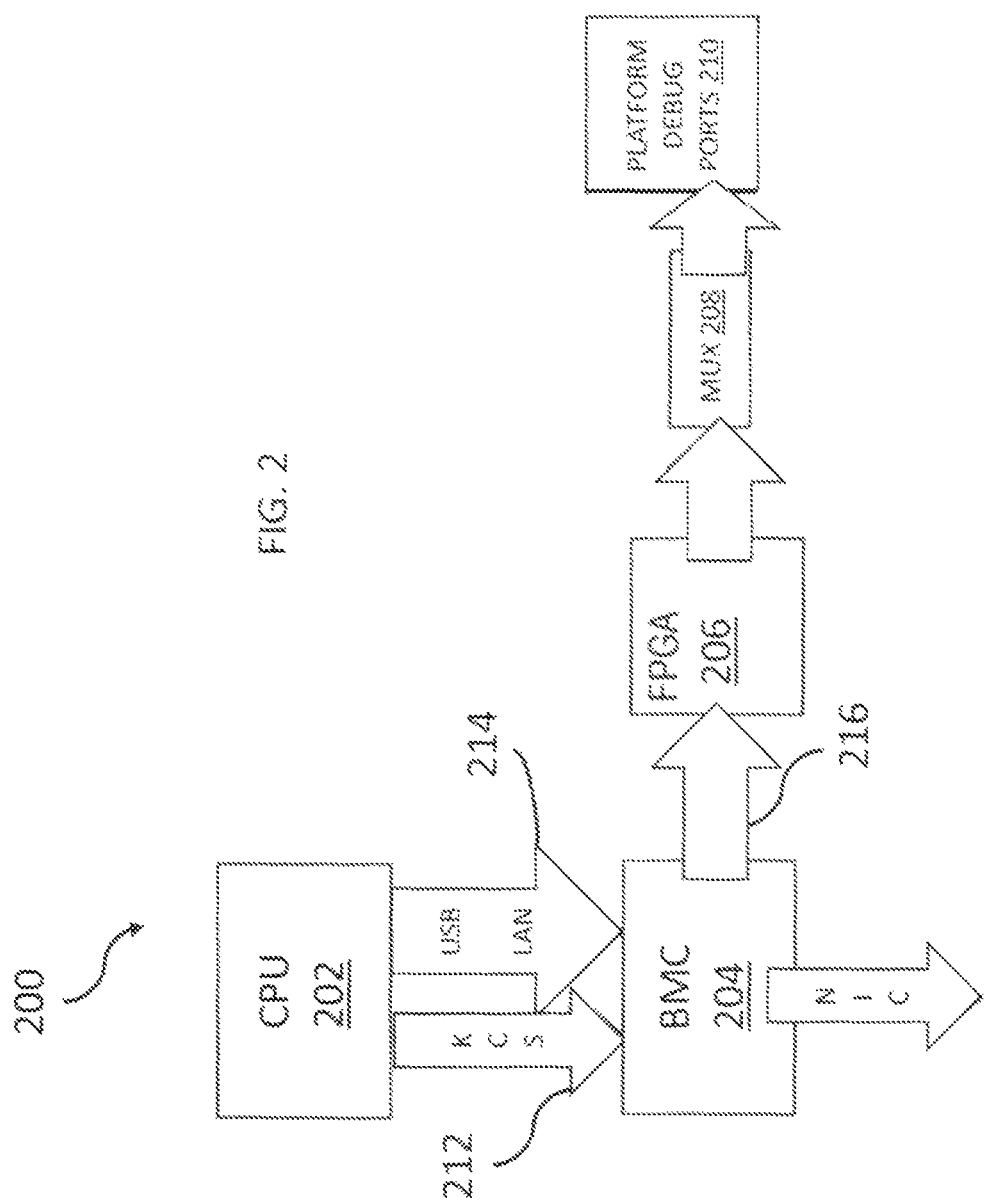
Figure 3:
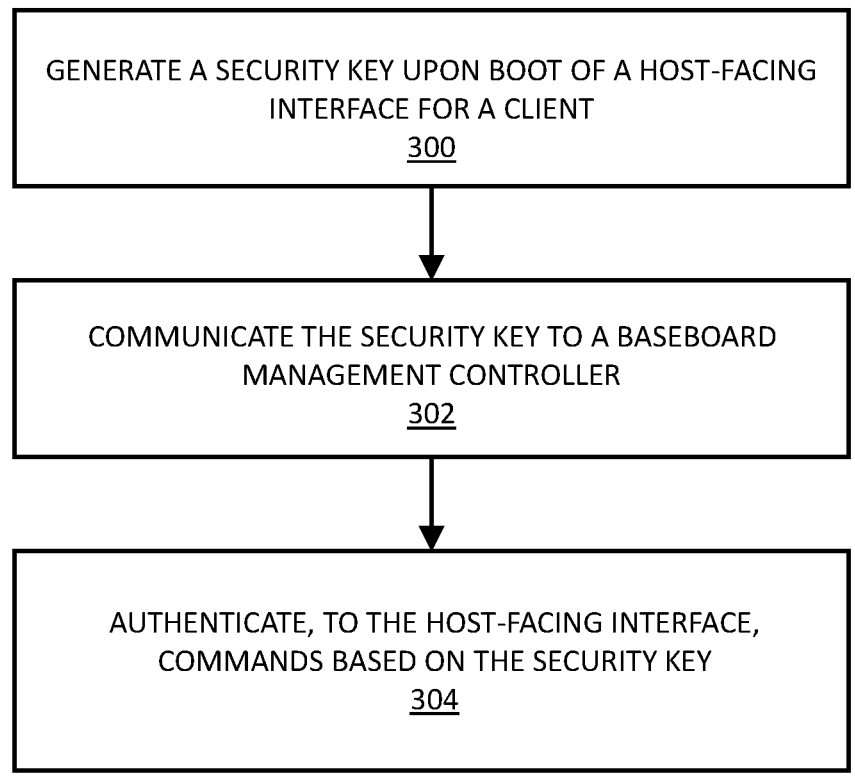
Figure 4:
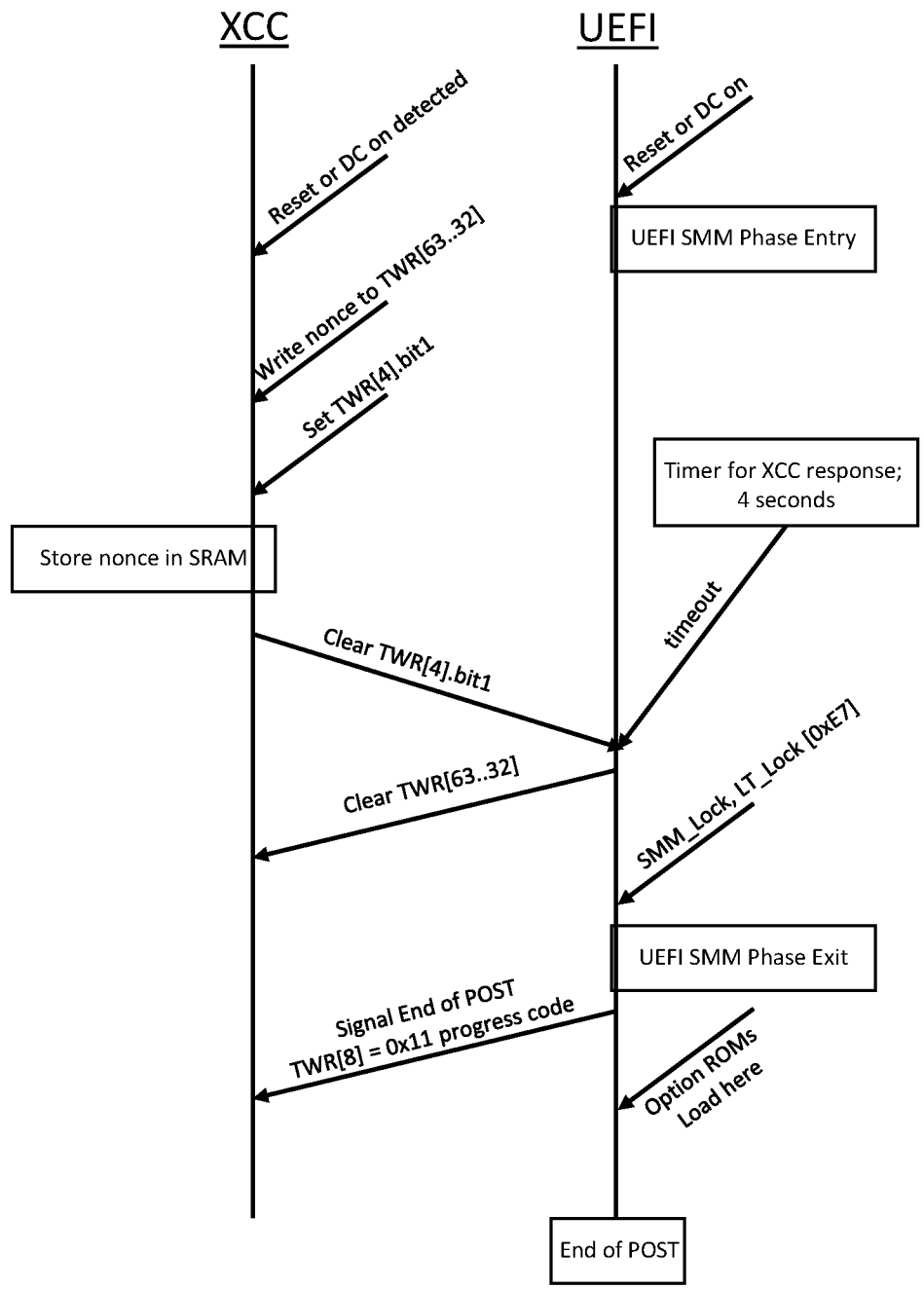
Figure 5:
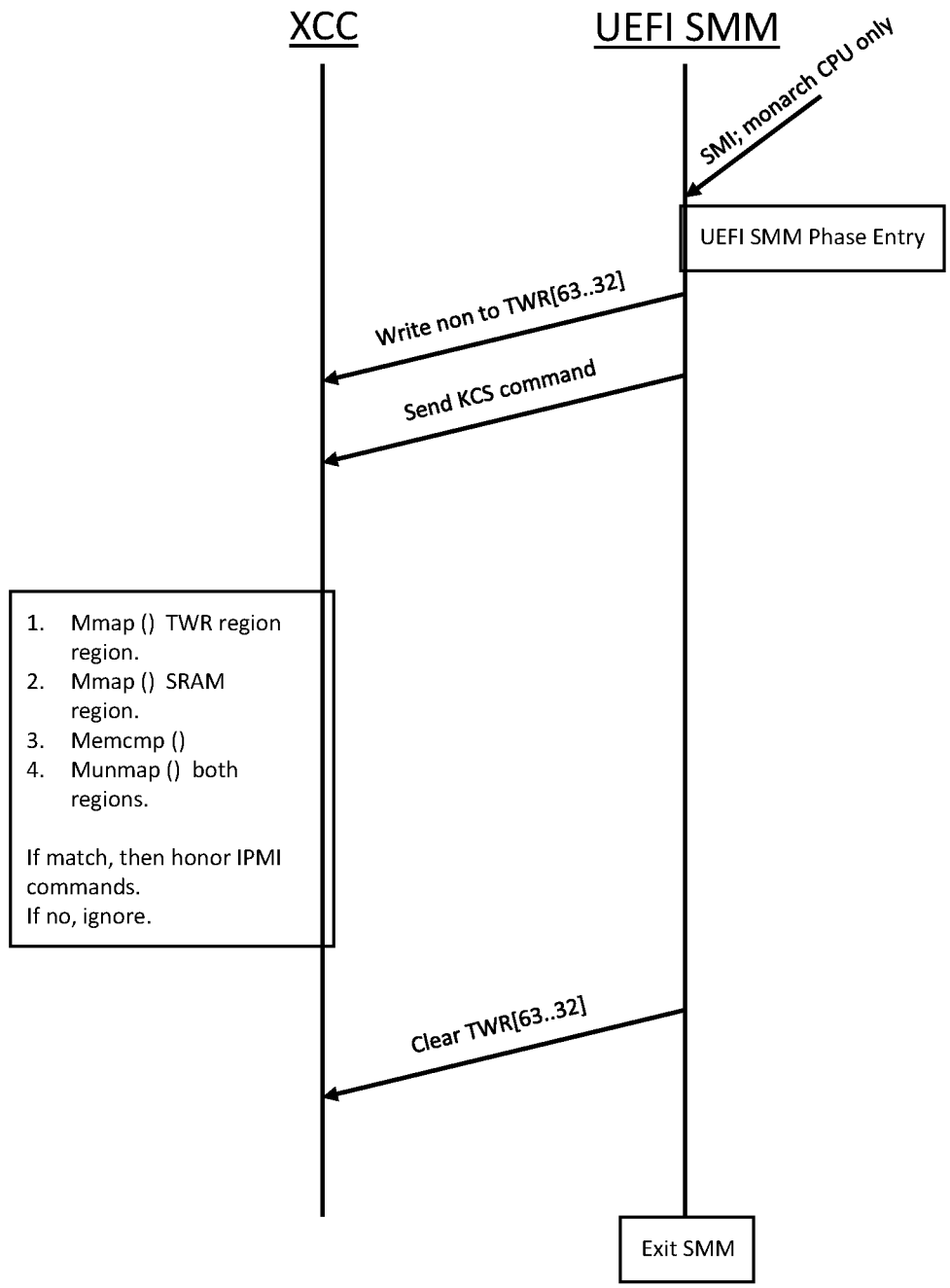

Having thus described the presently disclosed subject matter in general terms, reference will now be made to the accompanying Drawings, which are not necessarily drawn to scale, and wherein:

FIG. 1 is a block diagram of an example hosting server for managing security access in accordance with embodiments of the present disclosure;

FIG. 2 is a block diagram of another example hosting server for managing security access in accordance with embodiments of the present disclosure;

FIG. 3 is a flow diagram of an example method for authenticating privileged subsystem access by policy and by use of a security key generated at boot in accordance with embodiments of the present disclosure;

FIG. 4 is a flow diagram of example nonce exchange during boot in accordance with embodiments of the present disclosure; and FIG. 5 is a flow diagram of example runtime exchange in accordance with embodiments of the present disclosure.

SUMMARY

The presently disclosed subject matter discloses systems, computing devices, and methods for authenticating privileged subsystem access by policy and by use of a security key generated at boot. According to an aspect, a method includes generating a security key upon boot of a host-facing interface for a client. The method also includes communicating the security key to a baseboard management controller. Further, the method includes authenticating, to the host-facing interface commands, based on the security key.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Unless otherwise defined, all technical terms used herein have the same meaning as commonly understood by one of ordinary skill in the art to which this disclosure belongs.

The functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together but may comprise disparate instructions stored in different locations which, when joined logically together, comprise the computing device and achieve the stated purpose of the computing device. A computing device can also include any type of conventional computer, for example, a laptop computer or a tablet computer. Although many of the examples provided herein are implemented on smart phones, the examples may similarly be implemented on any suitable computing device, such as a computer.

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As used herein, the term "memory" is generally a storage device of a computing device. Examples include, but are not limited to, read-only memory (ROM) and random access memory (RAM).

FIG. 1 illustrates a block diagram of an example hosting server 100 for managing security access in accordance with embodiments of the present disclosure. The hosting server 100 includes firmware to implement a technique to open up unsecure interfaces to clients or tenants only under strict control of the hoster based on system boot state or administrator knowledge of tasks at the server or data center level, and also to boot by default into a configuration with a reduced attack surface prior to tenants having control. It is noted that the functionality of the server 100 described herein may be implemented by any other suitable computing device.

Referring to FIG. 1, the server 100 may include a server chipset 102, a trusted FPGA 104, and a BMC 106. Alternative to an FPGA, the server 100 may include any other suitable electronic device for implementing the functionality by the FPGA described herein. The chipset 102 functions as a platform controller hub (PCH) 108. The chipset 102 may also function as a host security manager to implement functionality described herein for maintaining and managing security of the server. In this example, the BMC 106 and the PCH/server chipset 102 communicate during boot to exchange a 256 bit secure nonce or any other suitable security key. Particularly, the server chipset 102 generates the security key and sends the security key to the BMC 106 using registers in the FPGA 104 as a mutually accessible trusted nonce exchange mechanism. The server chipset 102 may save or store the original nonce in a secure location, such as system management random access memory (SM-RAM). The BMC 108 may save or store the nonce in a secure location such as static random access memory (SRAM). When the server chipset 102 attempts to communicate with the BMC 106 (e.g., over a less secure protocol) the nonce must be initially presented to the BMC 106.

The BMC 106 may determine whether to accept the command by first comparing the nonce to a previously received nonce from the server chipset 102. If the BMC 106 accepts the nonce (i.e., it matches the previously exchanged nonce), the BMC 106 can enable communications on the less secure channel. The nonce can authenticate UEFI SMM to the BMC 106, thereby unlocking the communication channel and allowing commands to be processed subject to the defined policy.

The host can disable the less secure protocol by no longer presenting the nonce to the BMC 106. Commands that can be presented include any valid KCS command allowed by the defined policy. Example commands include, but are not limited to, read/write vital product data (VPD), send UEFI boot progress codes, request BMC information, read/write/delete BMC data store file, and add message to system event log.

The BMC 106 can manage policy enforcement. The policy information may be stored in a device accessible exclusively by the BMC. Once the BMC 106 has authenticated a command using the nonce, the BMC 106 can subsequently evaluate policy to determine whether the received command is allowed by policy. If allowed by the policy, the command may be executed. Otherwise, the BMC 106 can prevent the command from being executed. Policy may be provided by UEFI to the BMC prior to POST, it may be configured directly on the BMC 106 manually or dynamically, or it may be a static configuration defined on the BMC.

In accordance with embodiments, in response to determining that a received command is not allowed by policy or the security key is not authenticated, an external server port and/or debug header may be disabled to prevent execution of the command. For example, FIG. 2 illustrates a block diagram of another example hosting server 200 for managing security access in accordance with embodiments of the present disclosure. The hosting server 200 includes components to implement a technique to open up unsecure interfaces to clients or tenants only under strict control of the hoster based on system boot state or administrator knowledge of tasks at the server or data center level, and also to boot by default into a configuration with a reduced attack surface prior to tenants having control. It is noted that the functionality of the server 100 described herein may be implemented by any other suitable computing device.

Referring to FIG. 2, the system 200 includes a central processing unit (CPU) 202, a BMC 202, an FPGA 204, a multiplexer (MUX) 206, and platform debug ports 208. The interfaces shown as arrows are the ones to protect via security keys and policy. They are namely basic keyboard controller style Index I/O (KCS), NIC, or platform ports/header that can control platform firmware elements. Each arrow 212 and 214 shown in FIG. 2 depicts a way to communicate with the BMC 202. The interface may be a host KCS style interface, a USB LAN interface from host side, or the BMC 106 can be communicated with over its NIC interface by client device/application remotely connecting to it. Over each of these communication channels legacy, protocols like IPMI can be used to send commands which do not use key based protection or a policy to define which commands are allowed. Generally, all these interfaces may be secured against legacy protocols using systems and techniques disclosed herein.

Arrow 216 between BMC 204 and FPGA 206 shows that the BMC 204 can ask the FPGA 206 or directly drive platform logic to mux away debug interfaces such as JTAG, UART, or the like into BMC chip that are physically accessible otherwise, making them inert until a proper BMC authorization via secure policy change allows for such access for field debug reasons.

FIG. 3 illustrates a flow diagram of an example method for authenticating privileged subsystem access by policy and by use of a security key generated at boot in accordance with embodiments of the present disclosure. The method is described by example as being implemented by the server 100 shown in FIG. 1, but it should be understood that the method may alternatively be implemented by any suitable computing device.

Referring to FIG. 3, the method includes generating 300 a security key upon boot of a host-facing interface for a client. For example, the server chipset 102 may generate a security key, such as a nonce, upon boot of a host-facing interface for a client.

The method of FIG. 3 includes communicating 302 the security key to a BMC. Continuing the aforementioned example, the server chipset 102 may send the security key, or a nonce, to the BMC 106.

The method of FIG. 3 includes authenticating 304, to the host-facing interface, commands based on the security key. Continuing the aforementioned example, the BMC 106 may use the security key, or nonce, to authenticate to the server chipset 102 when attempting to communicate with the BMC 106. The BMC 106 may use the security key, or nonce, to compare it to the generate security key to determine whether to accept communications.

Example Scenario

In accordance with embodiments, a system management interrupt (SMI) handler of a server may make use of a dedicated KCS channel for IPMI communications. Use of this KCS channel may be restricted to the SMM handler only.

UEFI can transmit a newly generated cryptographic nonce or other security key to BMC during each boot of the unified extensible firmware (UEFI). At operating system (OS) runtime, the system management mode (SMM) code can unlock the SMI-KCS channel by re-sending the nonce before KCS communication. Before exiting the SMM code, UEFI can lock the SMI-KCS channel by clearing the nonce value. The BMC does not process IPMI traffic over the SMI-KCS channel unless it is unlocked by use of the nonce.

Within the BMC, any attempt to accept an IPMI request over the SMI-KCS channel may be blocked if register TWR[63 . . . 32] or any other suitable register does not match the pre-negotiated nonce. The nonce is a secure value. In an example, the cryptographic nonce is a 32 byte (256 bit) value generated by UEFI at each boot. In order for the hardware design to meet its security goals, a random number generator can continuously test itself and the random data it is generating. Runtime failures in the random number generator circuitry or statistically anomalous data occurring by chance can be detected by the self test hardware, and the resulting data can be flagged as being bad or unacceptable. In such a case, an instruction can be returned with no data instead of bad data.

The self-test may be in the CPU itself. The CF may be set based on success or failure. For example, CF=1 may indicate that the data in the destination is valid. If CF=0, the data in the destination operand may be returned as zeros for the specified width.

UEFI can compare 4×64 bit random values retrieved to create the 256 bit value to ensure they are nonzero and all different. UEFI can reset and try 3 times, for example, before halting if such issue persists. If such an issue exists, UEFI can flag a fatal hardware/CPU issue.

If the RNG value fails the self-test, then a nonce value of all zeros can be communicated to the BMC during the negotiation phase. This can signal to the BMC to disable the KCS-SMI channel until the next boot attempt where a new nonce value can be generated.

The nonce can be exchanged in a secure manner. After every server reset/dc-on the BMC shall prepare to receive a new nonce. FIG. 4 illustrates a flow diagram of example nonce exchange during boot in accordance with embodiments of the present disclosure. Referring to FIG. 4, the host UEFI generates nonce and passes it to the BMC via registers. Further, the host signals start of nonce handshake to BMC via register. The BMC reads nonce from registers and stores it in BMC SRAM. Further, the BMC signals end of nonce handshake to UEFI by clearing register. The host can also clear nonce from registers. In an example, register TWR[4].bit1 can be used to handshake for the nonce exchange. UEFI can write the nonce to register TWR[63 . . . 32] before setting register TWR[4].bit1. UEFI can wait with a timeout for BMC to clear the handshake bit. BMC can snapshot the nonce and clear register TWR[4].bit1. If the 4 second timeout occurs or the handshake bit is cleared UEFI can zero the register TWR[63 . . . 32] register space.

After the nonce is negotiated, UEFI can signal completion of the SMM handler readiness phase which will lock out any further "New Nonce Negotiation". Finally, UEFI can assert the 0x2E7 LT_Lock. This can prevent a host process from spoofing the negotiation sequence. BMC implements an Early Power On feature where UEFI is allowed to make progress on AC cycles before the BMC is fully operational. UEFI can ensure the BMC is in a state to latch the nonce by ensuring register TWR[9] bit 6 is set prior to beginning the handshaking phase (occurs before SMM phase in flow, not shown).

SMM code can write the nonce value into register TWR [63 . . . 32] prior to KCS communications. On SMM exit, UEFI can zero wipe register TWR[63 . . . 32]. FIG. 5 illustrates a flow diagram of runtime exchange in accordance with embodiments of the present disclosure.

The nonce can be stored in a secure location. The BMC may store the previously exchanged nonce for future comparison against the nonce value that the runtime SMI handler sends for unlocking the KCS-SMI channel. Furthermore, the stored nonce may be preserved across BMC resets to ensure KCS-SMI access across BMC restarts while the host remains running. The storage location may not be accessible remotely. A region of SRAM (I/O space) can be set aside for this storage. This can cover the persistence requirement. At the time of comparison an internal BMC application can mmap( ) to the SRAM region as well as to the TWR[64 . . . 32] registers to perform a memcmp( ). After the comparison both regions can be unmapped with munmap( ). Both regions are considered mem-mapped I/O and therefore not candidates for inclusion in any core dump images (see man core).

UEFI has no persistence requirements and shall store the generated nonce in SMRAM and locked upon gEfiSmmReadyToLockProtocolGuid. This can prevent even administrative level access from within the host.

Regarding DoS and attacks, TWR and KCS accesses are both executed to the Pilot4 BMC over eSPI running at 4 bits/cycle and @30 MHz. A single byte WRITE over the peripheral channel can take no less than 870 nS. For an attacker to brute force attack they will need to iterate across the entire 32 byte space (can do one byte at a time) and attempt an IPMI transaction for each iteration. Assuming they smartly wrote, only one nonce byte per test the test time for a single nonce value would be ~11 uS. A conservative estimate for iterating across all 256^32 values (looking at it byte-wise) may take over 4.0e+64 years. Given that no lockout mechanism is warranted there should be no DoS path.

Tests may include the following:
spoofing the New Nonce Negotiation phase from the OS
spoofing the New Nonce Negotiation phase from the OS across BMC restarts
spoofing the New Nonce Negotiation phase from the OS across BMC flashes
validating TWR[63 . . . 32] cleared on OS entry without BMC timeout during negotiation
validating TWR[63 . . . 32] cleared on OS entry with BMC timeout during negotiation
Attempting to use KCS with TWR[63 . . . 32]==0
Attempting to use KCS with TWR[63 . . . 32] non-zero but incorrect nonce
Attempting to use KCS with TWR[63 . . . 32] set to valid nonce
Ensuring SMI KCS access across BMC resets
Ensuring SMI KCS access across BMC flashes
Verifying unique nonce for each boot This test may be done on an internal BMC debug build. A compile time flag will enable display of the exchanged nonce after the "New Nonce Exchange" on the BMC serial debug port. Production builds may not be built with this compile time flag enabled.

In accordance with embodiments, an unsecure internal interface between host FW and the BMC is provided. A secure nonce (truly random number) may be generated every boot by the host FW and exchanged with the BMC while trusted code is running on the host. At the end of POST, the host-facing interface can be locked down by the BMC and no command is responded to until the valid nonce for that boot is sent to the BMC by the host. The host is free at this point to use the interface freely. When the host is done with the interface, it signals the BMC, for example by sending a null nonce. The BMC may subsequently locks down the host-facing interface again. A BMC administrator with highest privileges can dictate to the BMC when to turn this secure mode off, to allow early provisioning or maintenance scenarios under strict supervised control Such a solution could also be used to guard external BMC interfaces by requiring that any application trying to talk to BMC over a host chipset or out of band LAN based interface first exchange a valid trusted certificate before any commands are responded to by the BMC. This can secure what are traditionally legacy insecure external interfaces.

In other embodiments, secure system firmware like that running in the FPGA can mux away all the JTAG signals and ports available for system debug and only mux signals for active debug after secure certificate exchange.

In other embodiments, BMC may implement a whitelist of commands that are only responded to based on user policy configured in BMC by the user. It should be clear that further generalizations are possible.

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

As referred to herein, the terms "computing device" and "entities" should be broadly construed and should be understood to be interchangeable. They may include any type of computing device, for example, a server, a desktop computer, a laptop computer, a smart phone, a cell phone, a pager, a personal digital assistant (PDA, e.g., with GPRS NIC), a mobile computer with a smartphone client, or the like.

As referred to herein, a user interface is generally a system by which users interact with a computing device. A user interface can include an input for allowing users to manipulate a computing device, and can include an output for allowing the system to present information and/or data, indicate the effects of the user's manipulation, etc. An example of a user interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object.

As referred to herein, a computer network may be any group of computing systems, devices, or equipment that are linked together. Examples include, but are not limited to, local area networks (LANs) and wide area networks (WANs). A network may be categorized based on its design model, topology, or architecture. In an example, a network may be characterized as having a hierarchical internetworking model, which divides the network into three layers: access layer, distribution layer, and core layer. The access layer focuses on connecting client nodes, such as workstations to the network. The distribution layer manages routing, filtering, and quality-of-server (QoS) policies. The core layer can provide high-speed, highly-redundant forwarding services to move packets between distribution layer devices in different regions of the network. The core layer typically includes multiple routers and switches.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A method comprising:
generating a security key upon boot of a host-facing interface for a client;
communicating the security key to a baseboard management controller;
authenticating, to the host-facing interface, a first subset of commands for communicating over a secured channel based on the security key; and
in response to authentication:
allowing communication of the first subset of commands over the secured channel; and
disallowing communication of a second subset of commands over the secured channel.

2. The method of claim 1, further comprising responding to commands based on the security key.

3. The method of claim 1, further comprising implementing a policy associated with the other security key.

4. The method of claim 3, further comprising:
determining whether a received command is allowed by policy and a received security key is authenticated; and
in response to determining that the received command is allowed by policy and the received security key is authenticated, executing the command.

5. The method of claim 3, further comprising:
determining whether a received command is allowed by policy and a received security key is authenticated; and
in response to determining that the received command is not allowed by policy or the received other security key is not authenticated, preventing execution of the command.

6. The method of claim 3, further comprising using a baseboard management controller to manage the policy.

7. The method of claim 1, further comprising using a field programmable gate array (FPGA) to implement the steps of generating, communicating, and authenticating.

8. The method of claim 1, further comprising providing a list of the first subset of commands, wherein the first subset of commands are only responded to based on the security key.

9. The method of claim 1, wherein the other security key is a nonce.

10. The method of claim 1, wherein the interface is one of a host KCS style interface, USB LAN interface from host side, or NIC interface.

11. The method of claim 1, further comprising:
determining whether a received command is allowed by policy and the received other security key is authenticated; and
in response to determining that the received command is not allowed by policy or the received other security key is not authenticated, disabling at least one of an external server port and debug header to prevent execution of the command.

12. A computing device comprising:
a host security manager configured to:
generate a security key upon boot of a host-facing interface for a client; and
communicate the security key to a baseboard management controller;
authenticate, to the host-facing interface, a first subset of commands for communicating over a secured channel based on the security key; and
in response to authentication:
allow communication of the first subset of commands over the secured channel; and
disallow communication of a second subset of commands over the secured channel.

13. The computing device of claim 12, wherein the host security manager is configured to respond to commands based on the security key.

14. The computing device of claim 12, wherein the host security manager is configured to implement a policy associated with the other security key.

15. The computing device of claim 14, wherein the host security manager is configured to:
determine whether a received command is allowed by policy and a received security key is authenticated; and
execute the command in response to determining that the received command is allowed by policy and the received security key is authenticated.

16. The computing device of claim 14, wherein the host security manager is configured to:
determine whether a received command is allowed by policy and a received security key is authenticated; and
prevent execution of the command in response to determining that the received command is not allowed by policy or the received other security key is not authenticated.

17. The computing device of claim 14, further comprising a baseboard management controller configured to manage the policy.

18. The computing device of claim 12, wherein the host security manager is configured to provide a list of the first subset of commands, wherein the first subset of commands are only responded to based on the security key.

19. The computing device of claim 12, wherein the other security key is a nonce.

20. The computing device of claim 12, wherein the interface is one of a host KCS style interface, a USB LAN interface from host side, or a NIC interface.

* * * * *